B. MILEY.
NUT LOCK.
APPLICATION FILED JUNE 24, 1919.
1,339,120.
Patented May 4, 1920.
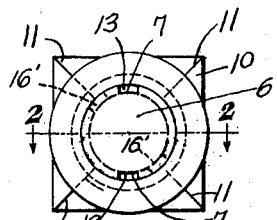
Fig. 1.
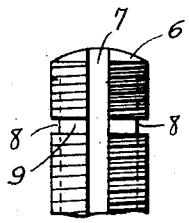
Fig. 3.
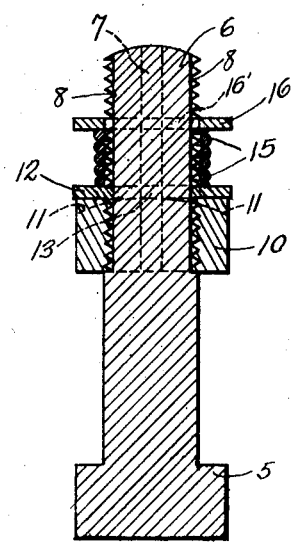
Fig. 2.
Fig. 4.
Fig. 5.
Fig. 6.
Inventor
B. Miley,
By C. A. Snow & Co.
Attorneys
Witness

UNITED STATES PATENT OFFICE.

BENJAMIN MILEY, OF WALLA WALLA, WASHINGTON.

NUT-LOCK.

1,339,120. Specification of Letters Patent. Patented May 4, 1920.

Application filed June 24, 1919. Serial No. 306,341.

*To all whom it may concern:*

Be it known that I, BENJAMIN MILEY, a citizen of the United States, residing at Walla Walla, in the county of Walla Walla and State of Washington, have invented a new and useful Nut-Lock, of which the following is a specification.

The present invention relates to nut locks, the object being to provide a nut lock which will positively retain the nut in locked position on the bolt and which also may be locked in any position on the bolt.

A second important object of the invention is to provide a nut lock which will be positively held against accidental rotation on the bolt and which may be readily and quickly disengaged therefrom without destroying or damaging the nut or bolt and without the use of tools.

Another general object of the invention is to provide a nut lock which is so constructed as not to place any strain upon the locking member used in locking the nut to the bolt.

Another general object of the invention is to provide a nut lock which is simple in construction, which consists of few parts, and which may be readily assembled and disassembled, and which may be manufactured and sold at a minimum cost.

With the above and other general objects and advantages in mind, the invention consists of the combinations of elements, constructions and arrangements, operations and general assemblage, the details of which will be hereinafter enlarged upon and recited in the subjoined claims, the invention being illustrated in the accompanying drawings, wherein:—

Figure 1 is an end elevation of the nut and bolt assembled; Fig. 2 is a longitudinal sectional view of the same taken on line 2—2 of Fig. 1; Fig. 3 is a fragmental elevation of the bolt; Fig. 4 is a side view of the locking washer; Fig. 5 is a side elevation of the nut and Fig. 6 is a top plan view of the locking washer.

In carrying out the invention there is provided a bolt 5 provided with the usual threaded shank 6 having a pair of longitudinal grooves 7 extending to the end of the bolt and disposed at diametrically opposite points thereon. A second pair of grooves 8 is provided and extends longitudinally of the shank at diametrically opposite points and between the first pair of grooves, these latter grooves 8 terminating short of the end of the bolt. The threads are stripped from the bolt at points centrally of the ends of the grooves to afford a pair of oppositely disposed peripheral grooves 9, each of which communicates with one of the grooves 7 and one of the grooves 8.

The nut is designated at 10 and has locking shoulders 11 formed at the corners thereof and upon its outer face, the base of each of these shoulders being formed at an incline. A locking washer 12 is provided for locking the nut against rotation which is provided with inwardly and laterally extended keys or tongues 13 formed at its inner edge which project within the grooves 7. An angularly disposed dog or lug 14 is formed on the other edge of the locking washer and is adapted to be engaged in any of the notches 11. It will be seen that when the locking washer is thus assembled the nut will be held against counter-clockwise rotation.

An expansible coil spring 15 is engaged on the bolt and bears against the washer 12 to retain the same in locked engagement with the nut. A spring retaining washer 16 having tongues 16' at diametrically opposite points is provided which is positioned on the bolt at one end thereof and engaged in the grooves 7 and moved longitudinally therein until the tongues are disposed in alinement with the peripheral grooves 9 and the washer then rotated to move the tongues through these peripheral grooves and into the longitudinal grooves 8. Upon releasing the washer the spring 15 then urges the same to the closed ends of the slots or grooves 8.

It will be seen that when the nut or bolt is thus assembled it will be impossible for the nut to rotate in a counter-clockwise direction. It will also be seen that when it is desired to disengage the nut from the bolt it will be only necessary to force the washer 16 toward the bolt until the tongues of the washer are disposed in alinement with the peripheral grooves 9, the washer being then rotated to bring the tongues into the grooves 7 and the spring 15 urges the washer from the bolt. The other parts may be then readily removed.

The construction here shown and described is considered the preferred embodiment of the invention but it will be understood that the same may be modified and altered in many respects and that such limits of modification are governed only by what is claimed.

What is claimed is:—

1. In a coupled nut and bolt, a bolt having a pair of longitudinal grooves at one end thereof and disposed at diametrically opposite points, and further provided with a second pair of longitudinal grooves at diametrically opposite points and between the first-mentioned grooves, the latter grooves terminating short of the end of the bolt, the bolt being also provided with peripheral grooves, one of each pair of grooves being in communication, a nut threaded on the bolt and provided with locking shoulders, a locking washer engaged on the bolt and bearing against the nut, tongues carried by the washer and engaged with the first-mentioned grooves, locking dogs carried by the washer and engaged with one of the locking shoulders, a second washer including a pair of inwardly projecting tongues which are insertible through the first-mentioned longitudinal grooves, the washer being then rotated to move the tongue through the peripheral grooves and engage the same in the last-mentioned grooves, and expansible means between the two washers urging the second washer toward the closed end of the grooves.

2. In combination with a bolt having a threaded portion, and having two sets of longitudinal grooves, and one set of circumferential grooves, a nut having opposed shoulders, a washer having a spring lug, and having inwardly extending tongues, said spring lug adapted to coöperate with one of the shoulders of the nut, for locking the nut and washer together, said tongues, adapted to be positioned in one set of the longitudinal grooves, a washer having inwardly extending tongues, coöperating with the other set of longitudinal grooves, a coiled spring interposed between the washers, for forcing the same in opposite directions, said tongues of the last named washer adapted to be guided to the circumferential grooves, by their passage through the longitudinal grooves.

3. In a nut lock, a threaded bolt having a pair of grooves extending to the end of the bolt and a second pair of grooves having their ends closed, one of each pair of grooves being in communication, a nut threaded on the bolt, a locking washer having inwardly directed tongues accommodated in the first-mentioned grooves, means carried by the nut and washer to retain the former against counter-clockwise rotation, a second washer including inwardly directed tongues adapted to be moved longitudinally in the first-mentioned grooves and then rotated axially to dispose the tongues in the closed grooves, and expansible means between the washers.

In testimony that I claim the foregoing as my own, I have hereto affixed my signature in the presence of two witnesses.

BENJAMIN MILEY.

Witnesses:
S. E. KING,
D. P. SHEPHERD.